Aug. 18, 1931.   H. MOCK   1,819,191
SPOON
Filed May 26, 1928
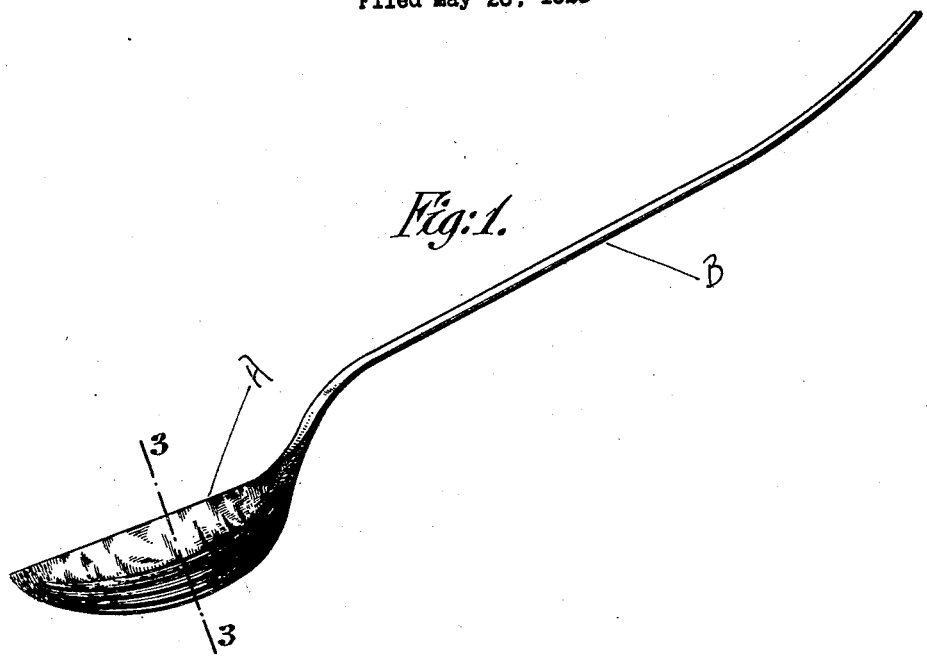
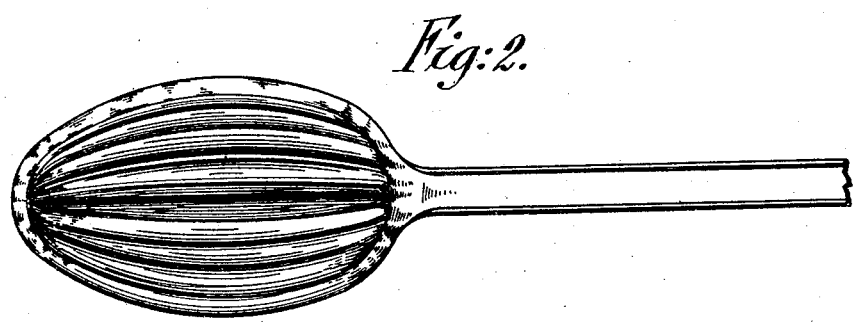
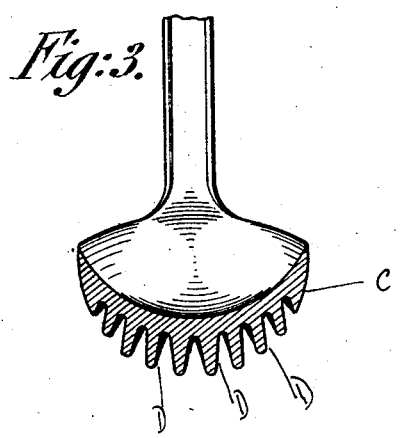
Hugo Mock
INVENTOR Patented Aug. 18, 1931

1,819,191

UNITED STATES PATENT OFFICE

HUGO MOCK, OF NEW YORK, N. Y.

SPOON

Application filed May 26, 1928. Serial No. 280,882.

This invention relates to improvements in spoons and has for its particular object the provision of a spoon which can be advantageously used on account of its heat transfer properties.

A particular object of my invention is the provision of a spoon which can be used to quickly heat or cool small quantities of liquids as will be hereinafter described.

Further objects of my invention will be apparent from the specification and drawings, in which—

Fig. 1 is a side view of my improved spoon,
Fig. 2 is a bottom plane view, and
Fig. 3 is a sectional view along the line 3—3 of Fig. 1.

The bowl A and handle B are of normal contour, but the underside of the bowl, and integral with the bowl, is thickened and corrugated as will be more clearly seen in Fig. 3 where the underside of the bowl is indicated as C having a series of corrugations DDD. The purpose of this is to provide the body of the bowl with a considerable amount of metal which can be quickly heated or cooled, permitting at the same time the spoon to be employed in normal fashion. A bowl of normal thickness would be one in which the metal of the bowl was not noticeably thicker than the metal in the handle, whereas in my construction the bowl is abnormally thickened to provide an extra mass of metal therein.

I prefer to make my improved spoon of aluminum because the specific heat of aluminum is high compared to its weight and volume, so that a spoon of given size has relatively more capacity for storing heat when made of aluminum than when made of other metals which would be unwieldy in weight if of the same size as the aluminum spoon.

It is well known, for instance, that the specific heat of aluminum is 0.2122, whereas that of silver is .0599 and that of iron 0.1124, whereas the specific gravity of aluminum is about 2.6 and that of silver is 10.6 and that of iron is 7.86. The heat capacity of a unit volume of a metal is obtained by multiplying the specific heat by the specific gravity. In the case of aluminum, this would give the figure of .55172 and in the case of silver, we get the figure of .64484. This means that one can obtain approximately the same heating or cooling effect by employing the same volume of aluminum as of silver with less weight inasmuch as a unit volume of aluminum would have a heat capacity of .55172 whereas the same volume of silver would have a heat capacity of only .64484 and would be almost four times as heavy.

The purpose of the corrugations is, of course, to have the metal in the body of the spoon, which is a good conductor of heat, function more quickly in the distribution of heat or cold.

My improved spoon is used in the following manner:

To cool hot liquids such as soup or coffee the spoon may be used as an ordinary spoon and on account of the large volume of metal in the body of the spoon, it will readily absorb heat from the body of the liquid so as to cool a small amount of liquid a number of degrees very quickly. This effect is accentuated if the spoon has been previously in a cold medium such as a refrigerator.

The spoon can also be readily used for cooling beverages, especially carbonated beverages, where the mixture of melted ice would be objectionable. In such cases it is best to keep one or more of such spoons in a refrigerator so that the temperature of the metal is as low as possible when they are inserted into the liquid to be cooled.

Similarly, a spoon of the character can be employed to heat a small volume of liquid quickly as if such spoons are taken from boiling water, they have sufficient heat capacity to warm a small volume of liquid quickly.

It will be apparent that various modifications may be made in the form of the spoon and in the size without departing from the spirit of my invention.

What I claim is:—

1. A metal spoon having a handle and a thickened bowl and a series of corrugations on the underside of said bowl, the metal of which said spoon is made having a high specific heat.

2. A spoon of aluminum having a thickened bowl and a series of deep corrugations on the underside of said bowl.

In testimony whereof I hereunto affix my signature.

HUGO MOCK.